Figure 1:
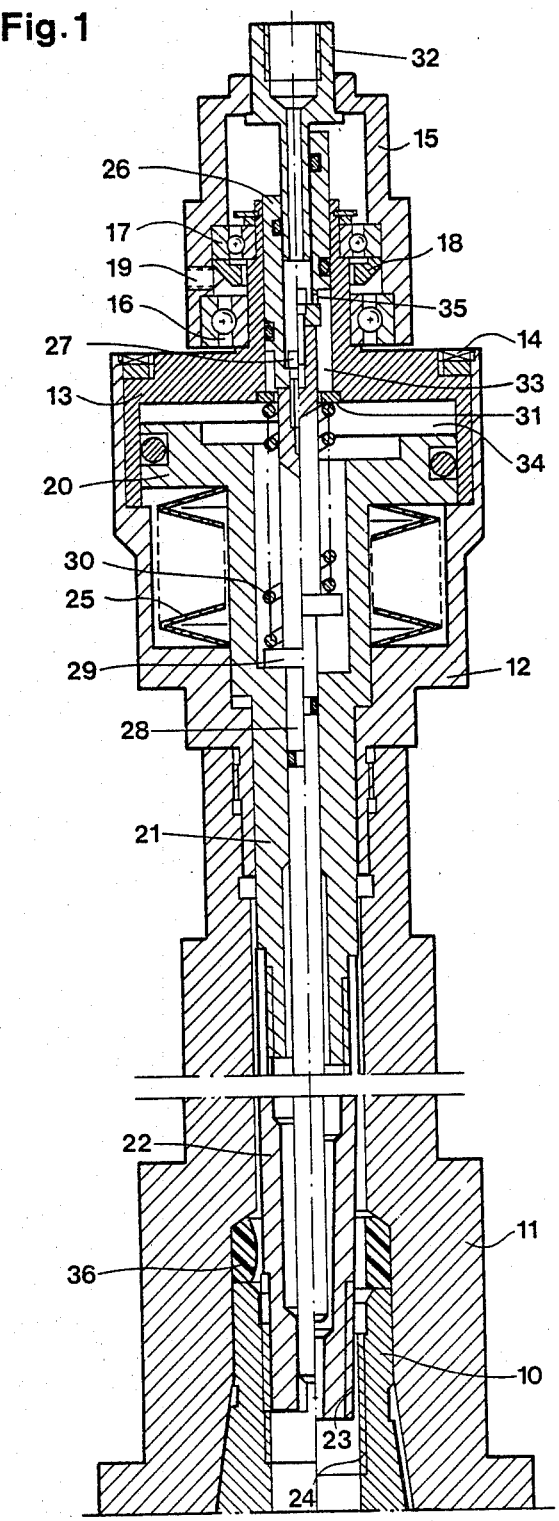

United States Patent [19]

Benatti

[11] 4,352,612

[45] Oct. 5, 1982

[54] TOOL FASTENING DEVICE

[75] Inventor: Edmo Benatti, Frassine-Mantova, Italy

[73] Assignee: Sandvik-Kosta GmbH, Renningen, Fed. Rep. of Germany

[21] Appl. No.: 166,845

[22] Filed: Jul. 8, 1980

[30] Foreign Application Priority Data

Jul. 10, 1979 [IT] Italy .................... 18122 A/79

[51] Int. Cl.³ .................................................... B23C 5/26
[52] U.S. Cl. ........................................ 409/233; 279/1 Q
[58] Field of Search .................. 409/233, 231, 232; 279/1 Q, 1 E, 1 S; 408/239 R, 239 A

[56] References Cited

U.S. PATENT DOCUMENTS

| | | | |
|---|---|---|---|
| 3,481,248 | 12/1969 | Engstrom | 409/233 |
| 3,490,333 | 1/1970 | Scruton | 409/233 |
| 4,011,791 | 3/1977 | Lanzenberger | 409/233 |
| 4,068,559 | 1/1978 | Schmid, Jr. et al. | 409/233 |
| 4,226,562 | 10/1980 | Schmid et al. | 409/233 |

FOREIGN PATENT DOCUMENTS 2741810 3/1979 Fed. Rep. of Germany ...... 409/233

Primary Examiner—William R. Briggs
Assistant Examiner—Jerry Kearns
Attorney, Agent, or Firm—Burns, Doane, Swecker & Mathis

[57] ABSTRACT

A tool fastening device comprises a drawbar (21, 22; 47, 48) for clamping a tool holder (10; 40) to a spindle (11; 41) of a machine tool by frictional engagement with a conical bore therein. The drawbar is connected to the tool holder by radially expansible locking means (23; 50) on the drawbar. The locking means is actuated by means of an expansion rod (28; 52). For purposes of facilitating the operation of the expansion rod there is provided forcing means (30; 57) which continuously forces the expansion rod toward the tool holder.

6 Claims, 2 Drawing Figures

TOOL FASTENING DEVICE

The present invention relates to a device for clamping a tool holder to a spindle of a machine tool, such as a milling machine or a boring machine. The clamping device comprises an axially shiftable drawbar having locking means which are radially movable for engagement with the tool holder. An expansion rod located within the drawbar is adapted to actuate the locking means.

In previously known tool fastening devices of the above type the tool holder is clamped in the conical bore in the machine spindle by applying an axially rearwardly directed force on the drawbar. The clamping force is transmitted from the drawbar to the tool holder by means of the locking means.

The object of the present invention is to provide a tool fastening device which is easy to handle, has a simple construction and thus is unexpensive and reliable. Another object of the invention is to simplify as much as possible the auxiliary means for operating the drawbar and locking means, such as control valves and the hydraulic actuating means.

The above and other objects are attained by giving the invention the characterizing features stated in the appending claims.

The invention is described in detail in the following description with reference to the accompanying drawings in which two embodiments are shown by way of example. It is to be understood that these embodiments are only illustrative of the invention and that various modifications thereof may be made within the scope of the claims.

In the drawings,

FIG. 1 shows a longitudinal section through one embodiment of a device according to the invention, wherein the locking means comprises an externally threaded portion on the drawbar which may be used in connection with all standard tool holders having an internally threaded axial bore. The left portion of the figure shows the tool fastening device in a clamped position and the right portion shows the device in a released position.

Figure 2:
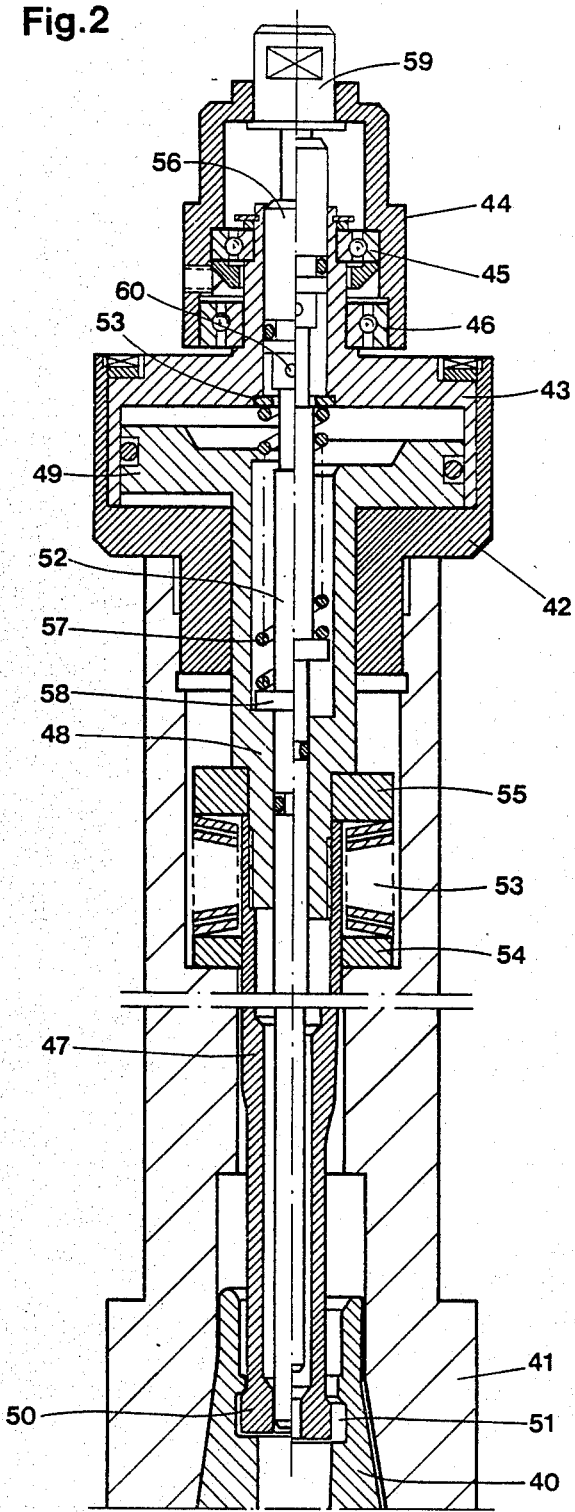

FIG. 2 shows a longitudinal section through another embodiment of a device according to the invention, wherein the clamping means comprises radial projections which are received by an annular groove in the tool holder. The left and right portions of the figure show the tool fastening device in a clamped and released position, respectively.

In FIG. 1, a tool holder 10 is received in the standard conical bore in the forward end of a spindle 11. The spindle 11 is threadedly attached to a cylinder housing 12 which is covered by a head portion 13. The head portion 13 is secured to the cylinder housing by means of screws 14 and rotatably connected to a supporting means 15 over ball bearings 16, 17. The outer ring of the ball bearing 17 is secured by means of a nut 18 and a pin 19. Thus, the unit comprising the spindle 11, the cylinder housing 12 and the head portion 13 is rotatable relative to the stationary supporting means 15.

A piston 20 is movable within the cylinder housing 12. A shaft portion 21 projecting from the piston 20 is threadedly attached to a draw cylinder 22. The shaft portion 21 and the draw cylinder 22 form a drawbar. The draw cylinder 22 is provided with external threads 23 adapted to engage internal threads 24 on the tool holder 10. In its released position, the expansible draw cylinder 22 is radially contracted, see the right portion of FIG. 1. In its clamped position, the draw cylinder 22 is radially expanded, see the left portion of FIG. 1, wherein the threads 23, 24 mesh with each other.

A package of plate springs 25 is mounted between a forwardly directed abutting surface on the piston 20 and a rearwardly directed abutting surface on the cylinder housing 12.

A piston 26 is guided by a rearwardly extending part of the head portion 13. The piston 26 is connected to an expansion rod 28 by means of a screw 27. The piston 26 extends through the piston 20 and the shaft portion 21 to the inner of the hollow draw cylinder 22.

The expansion rod 28 is provided with an annular shoulder 29 having a rearwardly directed abutting surface against which a spring 30 rests. The other end of the spring 30 rests against an abutting surface on a plate 31 which is secured to the head portion 13.

At the rear end of the supporting means 15 there is provided a connection 32 for a conduit through which hydraulic fluid is supplied into a recess in the piston 26. The hydraulic fluid is then admitted into a drive or working chamber 33, 34 through a bore 35 in the wall of the piston 26. It is thus obvious that upon admission of hydraulic fluid into the drive chamber 33, 34 the pistons 20, 26 move in opposite directions against the action of the springs 25, 30.

At the bottom of the bore in the forward end of the spindle 11 there is inserted a ring 36 of resilient material, such as rubber. The ring 36 facilitates the mutual engagement of the threads 23, 24.

The operation of the tool fastening device is described by starting from the clamped position shown to the left in FIG. 1. When the tool holder 10 is to be released hydraulic fluid is supplied to the drive chamber 33, 34 through the connection 32. When a predetermined pressure is reached the piston 20 is moved forwards against the action of the spring 25. The tool holder 10, thus, is moved forwards. The pressure in the chamber 33, however, is too low to cause a movement of the piston 26 relative to the piston 20, which means that the tool holder 10 remains clamped to the draw cylinder 22. However, when the pressure in the chamber 33 is further increased to a second predetermined value the piston 26 is moved rearwards against the action of the spring 30. The expansion rod 28, thus, is moved rearwards out of the front portion of the draw cylinder 22, which means that the draw cylinder is contracted and the tool holder 10 released as shown to the right in FIG. 1

When the tool holder 10 is to be clamped it is first inserted into the conical bore in the spindle 11. During this insertion the drive chamber 33, 34 is pressurized. Then the pressure in the drive chamber is decreased which causes the expansion rod 28 to be moved forwards by the spring 30, thereby expanding the draw cylinder 22 to cause the threads 23, 24 to mesh with each other. Upon a further decrease in pressure the piston 20 is moved rearwards by the spring 25, thereby drawing the draw cylinder 22 rearwards and thus clamping the tool holder 10 to frictional engagement with the conical bore in the spindle 11.

In the embodiment shown in FIG. 2 a tool holder 40 is inserted into a conical bore in a spindle 41. The spindle is threadedly attached to a cylinder housing 42 and a head portion 43 is rotatably connected to a stationary supporting member 44 over ball bearings 45, 46.

An expansible draw cylinder 47 is connected to a shaft portion 48 of a piston 49. At the forward end of the draw cylinder 47 there is provided projections 50 which can be moved into an annular groove 51 in the tool holder 40 by means of an expansion rod 52. A package of plate springs 53 is mounted between rings 54, 55 which rest against respectively the spindle 41 and the shaft portion 48.

A piston 56 is connected to the expansion rod 52. A spring 57 is mounted between a shoulder 58 on the expansion rod 52 and a ring 53 in the head portion 43.

Hydraulic fluid is supplied through a connection 59 into a recess in the piston 56 and via a bore 60 into the drive chamber of the pistons 49, 56. The piston 56, which is not shown in section, is designed in similarity with the piston 26 in FIG. 1. The device in FIG. 2 operates in the same manner as the device in FIG. 1.

The device according to the invention has in general a simple construction. In particular, the operation of the two pistons is simple since they are hydraulically actuated in only one direction and by the same driving fluid.

The illustrated embodiments may be modified within the claims. For instance, the conduit for supplying hydraulic fluid can alternatively be connected at the side wall of the cylinder housing. Further, instead of using the springs 30, 57 as forcing means a second hydraulic chamber may be provided, which is continuously pressurized. The fluid therein acts upon a rear drive surface on the pistons 26, 56. For providing the required spring action the second hydraulic chamber is preferably connected to an accumulator.

I claim:

1. Apparatus for clamping a tool holder to a spindle having a longitudinal bore, comprising: a drawbar movably mounted in said bore, a drawbar actuator for longitudinally moving said drawbar in reciprocable movement between an extended position for insertion and removal of the tool holder and a retracted position for securement of the tool holder comprising first spring means biasing said drawbar toward said retracted position, and a first actuating piston for moving said drawbar toward its extended position against the bias of said first spring means, locking means carried by said drawbar which are radially movable between a locking position for lockingly engaging the tool holder and an unlocking position for releasing the tool holder, and lock moving means for radially moving said locking means, a lock actuator comprising second spring means for biasing said lock moving means to move said locking means toward said locking position, and a second actuating piston for moving said lock moving means to move said locking means toward said unlocking position against the bias of said second spring means, wherein said first and second pistons each have a surface exposed to a common work chamber to which pressurized fluid is supplied, the relationship between the exposed surface areas of said first and second pistons and the biasing strengths of said first and second spring means being such that said first piston is actuated by a fluid pressure in said common work chamber which is lower than that at which said second piston is actuated.

2. Apparatus according to claim 1, wherein said lock moving means includes an expansion rod movably mounted in said drawbar for expanding a distal end of said drawbar.

3. Apparatus according to claim 1, wherein said first and second actuating pistons are biased in opposite directions by said first and second spring means.

4. Apparatus according to claim 1, wherein said first and second pistons are coaxially arranged, said second piston having a recess in which recess pressurized working fluid is conducted, said second piston further having a bore communicating said recess with said working chamber.

5. Apparatus according to claim 1, wherein the spindle includes a bore into which the tool holder is pulled upon retraction of said drawbar, an annular resilient member disposed at the bottom of said bore and against which the tool holder abuts.

6. Apparatus according to claim 1 including a stationary support means, said spindle, drawbar, locking means and actuating means being mounted to said support means by bearings for rotation relative to said support means.

* * * * *